Sept. 28, 1965　　　G. A. DAINES　　　3,208,840
FABRICATING APPARATUS FOR A VITREOUS LAMP MEMBER
Filed May 15, 1961　　　3 Sheets-Sheet 1
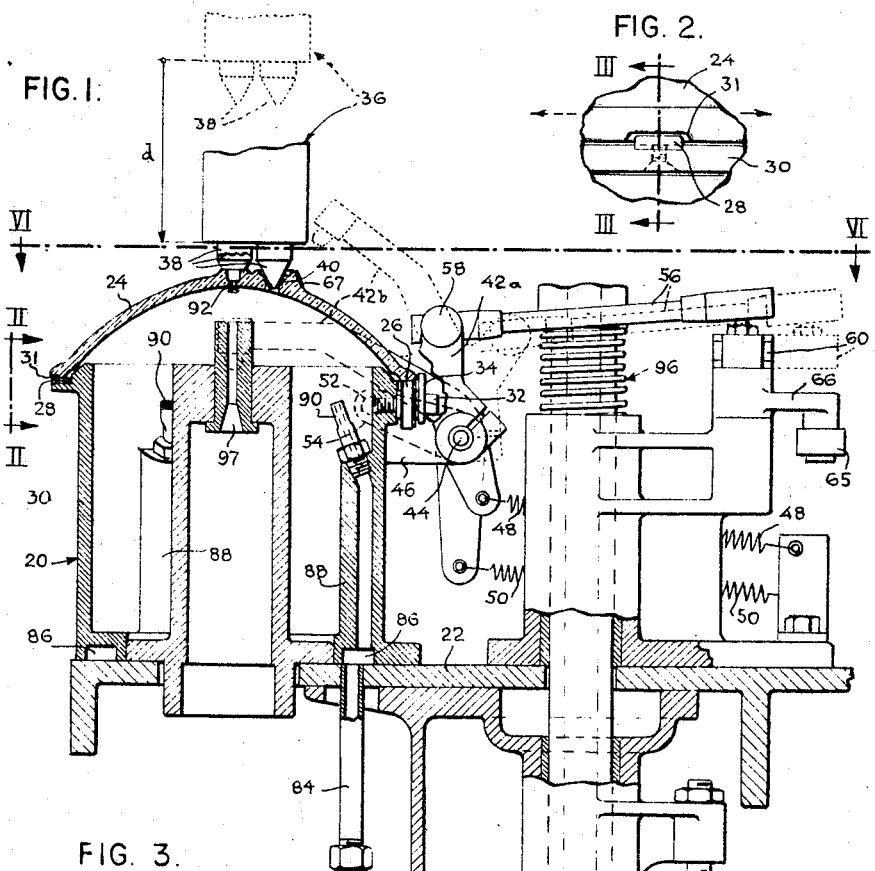
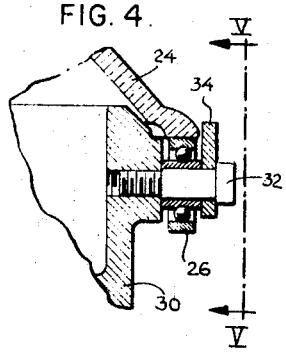
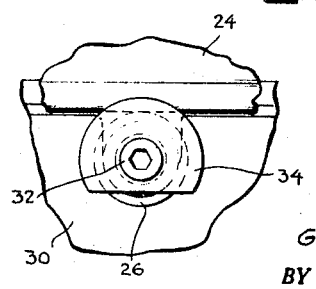
INVENTOR.
GEOFFREY A. DAINES.
BY
ATTORNEY.

Sept. 28, 1965  G. A. DAINES  3,208,840
FABRICATING APPARATUS FOR A VITREOUS LAMP MEMBER
Filed May 15, 1961  3 Sheets-Sheet 2

INVENTOR.
GEOFFREY A. DAINES.
BY
ATTORNEY.

Sept. 28, 1965  G. A. DAINES  3,208,840
FABRICATING APPARATUS FOR A VITREOUS LAMP MEMBER
Filed May 15, 1961  3 Sheets-Sheet 3

INVENTOR.
GEOFFREY A. DAINES.
BY
ATTORNEY.

United States Patent Office 3,208,840
Patented Sept. 28, 1965

3,208,840
FABRICATING APPARATUS FOR A VITREOUS LAMP MEMBER
Geoffrey A. Daines, West Caldwell, N.J., assignor to Westinghouse Electric Corporation, East Pittsburgh, Pa., a corporation of Pennsylvania
Filed May 15, 1961, Ser. No. 110,158
7 Claims. (Cl. 65—155)

The present invention relates to a ferrule inserting and tubulating apparatus for a sealed beam reflector and, more particularly, to an improved holder assembly for such an apparatus.

Heretofore, the ferrules and the exhaust tube have been sealed to the reflector for a sealed beam lamp (of the type shown in U.S. Patent No. 2,148,314 issued February 21, 1939, to D. K. Wright) by a ferrule inserting and tubulating apparatus of the type shown in U.S. Patent No. 2,288,537 issued June 30, 1942, to F. J. Malloy. Recently in order to decrease the weight of a sealed beam lamp and at the same time to increase the number of reflectors which can be molded from a given batch of molten glass, the wall thickness of the reflectors has been reduced. As a result the portion of a reflector adjacent the ferrule wells (i.e. the heel of the reflector) becomes more plastic than heretofore during the inserting operation, thus causing distortion or warping of the reflector with a resultant unsatisfactory beam pattern in the finished sealed beam lamp.

Further, when the reflector is finally and precisely positioned on the holder assembly of the conventional ferrule inserting and tubulating apparatus prior to the insertion of the ferrules, resistive friction between the reflector and the holder assembly often prevents the pisitioning mechanism from properly positioning the ferrule wells of the reflector on the conventional holder assembly. As a result the ferrules occasionally are not properly seated in the ferrule wells thus causing a tilted ferrule seal which results in a defective reflector assembly or which causes lead wire and filament alignment problems on the mounting machine.

It is the general object of the present invention to avoid and overcome the foregoing and other difficulties of and objections to prior art practices by the provision of an improved holder assembly for a ferrule inserting and tubulating apparatus, which holder assembly facilitates the precise positioning of the reflector prior to the ferrule inserting operation and which prevents distortion of the reflector during the ferrule inserting operation.

The aforesaid objects of the present invention, and other objects which will become apparent as the description proceeds, are achieved by providing a holder assembly for a lamp envelope, the holder assembly having a body supporting means on the body for supporting the envelope and for permitting substantially frictionless movement of the envelope with respect to the body, and fluid cooling means disposed within the body for directing cooling fluid at a preselected portion of the envelope.

For a better understanding of the present invention reference should be had to the accompanying drawings, wherein like numerals of reference indicate similar parts throughout the several views and wherein:

FIG. 1 is a fragmentary side-elevational view, partially in vertical section, of a turret and the improved holder assembly at the reflector positioning station of a ferrule inserting and tubulating apparatus;

FIG. 2 is an enlarged fragmentary side-elevational view along the line II—II of FIG. 1 in the direction of the arrows;

FIG. 3 is a vertical-sectional view along the line III—III of FIG. 2 in the direction of the arrows;

FIG. 4 is an enlarged fragmentary view of the reflector supporting means shown in FIG. 1 with the frictionless roller shown in section;

FIG. 5 is a fragmentary side-elevational view along the line V—V of FIG. 4 in the direction of the arrows;

Although the principles of the present invention are broadly applicable to inserting and tubulating apparatus for lamp envelopes in general, the present invention is particularly adapted for use in conjunction with reflectors for sealed beam lamps and hence it has been so illustrated and will be so described.

Figure 12:
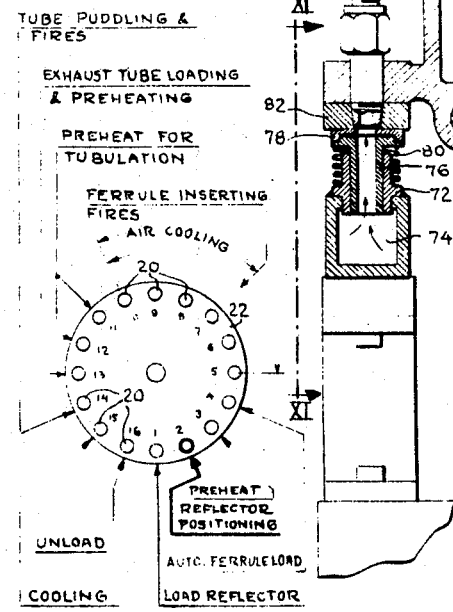
FIG. 12 is a diagrammatic plan view of the ferrule inserting and tubulating apparatus.

With specific reference to the form of the present invention illustrated in the drawings, and referring particularly to FIGS. 1, 6, 10 and 12 an improved holder assembly of the present invention is indicated generally by the reference numeral 20 and is mounted on a turret 22 of a ferrule inserting and tubulating apparatus of the type disclosed in the above-mentioned U.S. Patent No. 2,288,537. As shown in FIG. 12, there are sixteen holder assemblies 20 mounted in spaced relation on the periphery of the turret 22.

Figure 6:
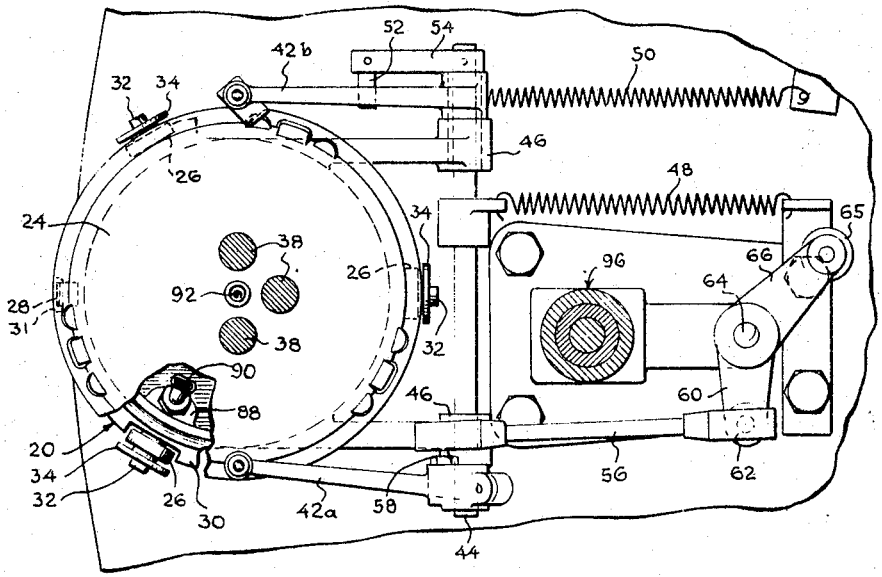
FIG. 6 is a horizontal-sectional view along the line VI—VI of FIG. 1 in the direction of the arrows.
Figure 7:
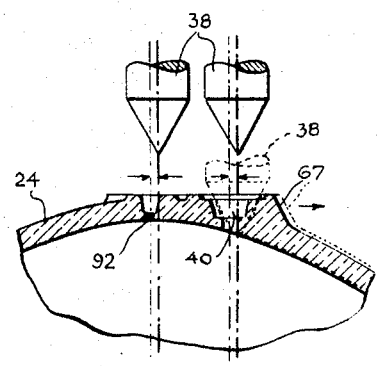
FIG. 7 is an enlarged fragmentary side-elevational view of the heel of the reflector and showing an intermediate solid-line position of a portion of the positioning mechanism wherein the lighter centerlines indicate the initial uncorrected position of the reflector and the heavier centerlines indicate the final corrected position of the reflector.
Figure 9:
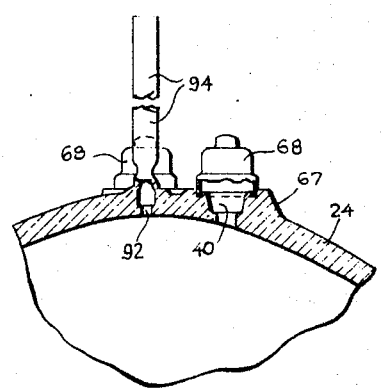
FIG. 9 is a view similar to FIG. 7 of a portion of the finished reflector assembly produced by the ferrule inserting and tubulating apparatus.
Figure 8:
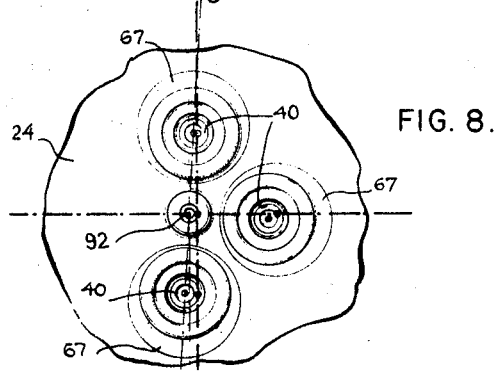
FIG. 8 is a plan view of the reflector heel and the positioning mechanism shown in FIG. 7 with the positioning plungers omitted for clarity.
Figure 10:
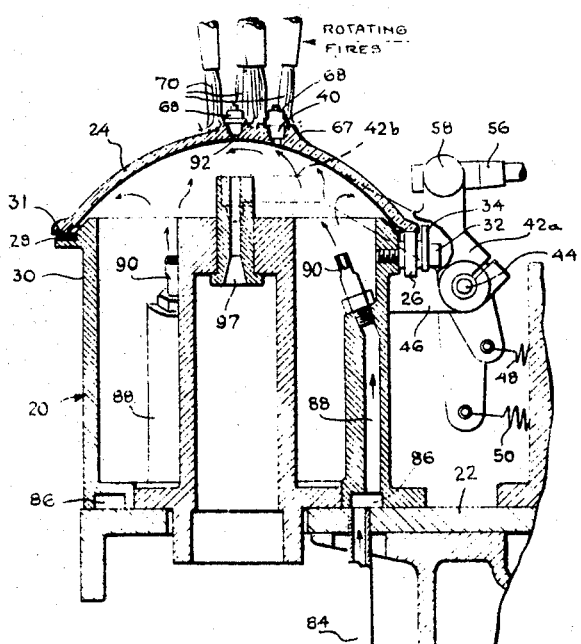
FIG. 10 is a view similar to FIG. 1 illustrating the operation of a cooling means within the holder assembly at the ferrule inserting station of the ferrule inserting and tubulating apparatus.

At Station "1" of the ferrule inserting and tubulating apparatus (FIG. 12), a lamp envelope, such as a reflector 24 (FIGS. 1–10), is preliminarily positioned on substantially frictionless supporting means, such as the ballbearing type rollers 26 (FIGS. 1, 4, 5, 6 and 10), by an operator so that a positioning key 28 (FIGS. 1–3, 6 and 10) on the periphery of a body 30 (FIGS. 1–6 and 10) of the holder assembly 20 enters a keyway 31 (FIGS. 1–3, 6 and 10) molded into the reflector 24. As shown in FIG. 6, there are three such rollers 26, each mounted in spaced relation on the periphery of the body 30 by means of a headed bolt 32 (FIGS. 1, 4, 5, 6 and 10). In order to provide retaining means which positively retain the reflector 24 on the rollers 26, each such bolt 32 carries a retaining member, such as a segmented disc 34 (FIGS. 1, 4, 5, 6 and 10).

Thereafter, the now loaded holder assembly 20 is indexed by a conventional indexing mechanism (not shown, but of the type disclosed in U.S. Patent No. 2,569,852 issued October 2, 1951, to J. H. Green) to Station "2" (FIG. 12), the reflector positioning station.

At station "2" a positioning mechanism 36 (FIG. 1) carrying three positioning plungers 38 (FIGS. 1, 6 and 7) moves such plungers 38 through a distance "d" from the dotted-line position shown in FIG. 1 (through the intermediate solid-line position shown in FIG. 7) to the solid-line position shown in FIG. 1 where such plungers 38 have entered and seated themselves in ferrule wells 40 (FIGS. 1 and 7–10) in the reflector 24. As the positioning plungers 38 enter and seat themselves in the ferrule wells 40, the rollers 26 permit frictionless rotation of the reflector 24 by the positioning plungers 38 in counterclockwise direction (in the situation illustrated in FIGS. 7 and 8) through the angle $\theta$ to precisely position the reflector 24 for the ferrule inserting operation to be performed at Station "4" (FIG. 12).

Thereafter at Station "2" a pair of securing arms 42a and 42b (FIGS. 1, 6 and 10) are rotated from the upper dotted-line position (FIG. 1) into engagement with the reflector 24 and into the lower dotted-line position shown in such figure to secure the positioned reflector 24 and to permit retraction of the positioning mechanism 36 preparatory for the index of the holder assembly 20 and the reflector 24 to Station "3," a preheating station (FIG. 12).

As shown in FIG. 6, the securing arm 42a (shown in the lower portion of such figure) is affixed to a shaft 44 (FIGS. 1, 6 and 10) journalled in bearings 46 and is normally biased by a spring 48 to the lower dotted-line (or reflector securing) position shown in FIG. 1. The other or floating securing arm 42b (FIG. 6) is rotatable on the shaft 44 and is biased by a spring 50 into engagement with a pin 52 (FIGS. 1 and 6) carried by an arm 54 secured to the shaft 44. The drive means (FIGS. 1 and 6) for raising the arms 42a and 42b has a connecting rod 56 (FIGS. 1, 6 and 10) connected to the arm 42a at 58 and to an upper arm 60 at 62. The upper arm 60 (FIGS. 1 and 6) is secured to a shaft 64 (FIG. 6) rotatable by the engagement of cam means (not shown) with a roller 65 carried by a lower arm 66 on the shaft 64. In order to compensate for irregularities in the wall thickness in the reflector 24, the floating securing arm 42b engages the reflector 24 before the securing arm 42a engages such reflector 24 thus insuring securement of the positioned reflector 24 at two locations.

After the positioning mechanism 36 is retracted from the solid-line position of FIG. 1 to the upper dotted-line position shown in such figure, the holder assembly 20 and the positioned reflector 24 secured therein are indexed to Station "3" where a heel 67 (FIGS. 1, 7–9 and 10) of such reflector 24 is preheated.

At Station "4" (FIG. 12) ferrules 68 (FIGS. 9 and 10) are automatically seated by hand or by automatic devices (not shown) into the ferrule wells 40 in the reflector 24. From Stations "5" through "10" (FIG. 12) the fires from rotating burners 70 (FIG. 10) heat the heel 67 of the reflector 24 to drive the plasticized edges of the ferrule wells 40 into hermetic engagement with the ferrules 68. Adjacent Stations "7" through "10" the inner surface of the heel 67 is cooled by a fluid cooling means (shown in FIGS. 1, 6 and 10) which directs cooling fluid at a preselected portion (i.e. the heel 67) of the reflector 24 to prevent over plasticization and ultimate distortion of the heel 67 by the fires from the rotating burners 70.

*Cooling means*

Figure 11:
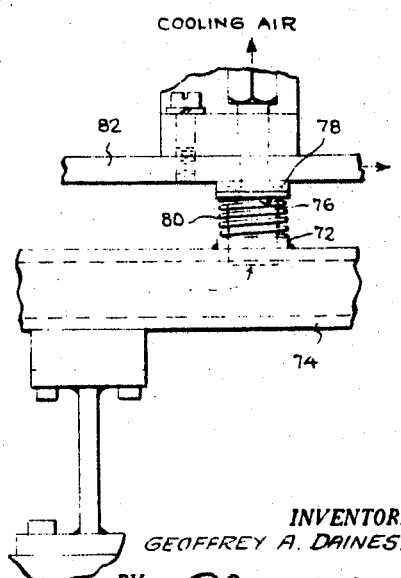
FIG. 11 is a fragmentary side-elevational view along the line XI—XI of FIG. 10 in the direction of the arrows.

At each of the above-mentioned Stations "7" through "10" (FIG. 12) at which stations the heel 67 of the reflector 24 is air cooled, a fixed sleeve 72 (FIGS. 10 and 11) is secured to an air supply manifold 74 and receives an inner sleeve 76. A wear-resistant plate 78 of nylon on the inner sleeve 76 is biased by a spring 80 against a circular track 82 (FIGS. 1, 10 and 11) carried by the turret 22. When the holder assembly 20 indexes into each of the Stations "7" through "10," an inlet tube 84 (FIGS. 1 and 10 associated with the holder assembly and extending through the track 82) registers with a central bore in the plate 78 and the inner sleeve 76 thus permitting cooling fluid, such as high pressure cooling air from the air supply manifold 74, to enter an annular distribution manifold 86 (FIGS. 1 and 10) within the body 30. This distribution manifold 86 conducts the cooling air to three outlet tubes 88 (FIGS. 1, 6 and 10), each having a nozzle 90 on the end thereof for directing the cooling air at the heel 67 of the reflector 24 (as indicated by the arrows in FIG. 10) to prevent overheating and ultimate distortion of such heel 67. During index of the holder assembly 20 between stations, the flow of air into such holder assembly 20 is shut off.

At Stations "11" and "12" (FIG. 12) the heel 67 of the reflector 24 adjacent a tubulation bore 92 (FIGS. 1, 6, 7, 8, 9 and 10) is preheated preparatory for the positioning of an exhaust tubulation 94 (FIG. 9) on (and in registry with) such bore 92 and for the preheating of the tubulation 94. A vertically reciprocable mechanism (portions of which are shown in FIGS. 1 and 6 and indicated generally by the reference numeral 96 in FIGS. 1 and 6) reciprocates the tubulation 94 slightly (i.e. puddles the seal between the exhaust tubulation 94 and the heel 67) at Station "14" to achieve the desired hermetic engagement therebetween. During this puddling operation a carbon reamer (not shown) is inserted through a guide 97 (FIGS. 1 and 10) within the body 30 to keep the tubulation 94 and bore 92 open. The now completed reflector assembly (FIG. 9) is cooled at Station "15" and discharged at Station "16."

It will be recognized by those skilled in the art that the objects of the present invention have been achieved by providing an improved holder assembly for a ferrule inserting and tubulating apparatus, which improved holder assembly permits the precise and positive positioning of a reflector thereon prior to the ferrule inserting operation and which prevents overheating and distortion of the reflector during the ferrule inserting operation.

While in accordance with the patent statutes a preferred embodiment of the present invention has been illustrated and described in detail, it is to be particularly understood that the invention is not limited thereto or thereby.

I claim:

1. Fabricating apparatus for a vitreous lamp envelope member, said envelope member having vitreous lamp part receiving members provided in a surface thereof, said apparatus comprising:

(a) a turret adapted to be indexed through a plurality of work stations;

(b) a plurality of spaced frictionless-type supporting members carried on said turret for supporting the envelope member during processing, said supporting members permitting the supported envelope member to be rotatably moved with respect to said turret;

(c) envelope member positioning means movable into registry with the lamp part receiving members provided in a surface of said envelope member to rotate said envelope member with respect to said turret through an amount as required to place said envelope member in predetermined position with respect to said turret;

(d) envelope member holding means operable to restrain said envelope member from any further rotation with respect to said turret after said positioning means has placed said envelope member in predetermined position on said turret;

(e) means for inserting additional lamp members into the vitreous receiving members provided in said positioned envelope member;

(f) sealing fire means to heat the vitreous receiving members provided in said envelope member to fuse said additional lamp members therein;

(g) cooling means for directing a cooling medium at the envelope surface opposite to the receiving members during heating to prevent envelope member overheating; and (h) timing means for controlling the operation of said turret, said positioning means, said holding means, said additional lamp member inserting means, said sealing fire means, and said cooling means in the foregoing work sequence.

2. The apparatus as specified in claim 1, wherein said envelope member is the glassware for the reflector member of a sealed-beam lamp, and wherein said vitreous lamp part receiving members are ferrule receiving pockets provided in a surface of the glassware for said reflector member.

3. The apparatus as specified in claim 7, wherein said frictionless-type supporting members comprise rollers which support the peripheral portion of the glassware for said reflector member.

4. The apparatus as specified in claim 1, wherein the cooling medium directed at the envelope surface by said cooling means is an air stream.

5. The apparatus as specified in claim 1, wherein after said holding means operates to restrain said envelope member from any further rotation with respect to said turret, said positioning means is retracted from contact with the lamp part receiving members.

6. Fabricating apparatus for a vitreous lamp envelope member, said envelope member having vitreous lamp part receiving members provided in a surface thereof, said apparatus comprising:
  (a) a turret adapted to be indexed through a plurality of work stations;
  (b) a plurality of spaced frictionless-type supporting members carried on said turret for supporting the envelope member during processing, said supporting members permitting the supported envelope member to be rotatably moved with respect to said turret;
  (c) preliminary positioning means for initially positioning said envelope member on said frictionless-type supporting members while still permitting limited rotation of said envelope member with respect to said turret;
  (d) envelope member positioning means movable into registry with the lamp part receiving members provided in a surface of said envelope member to rotate said envelope member with respect to said turret through an amount as required to place said envelope member in exact predetermined position with respect to said turret;
  (e) envelope member holding means operable to restrain said envelope member from any further rotation with respect to said turret after said positioning means has placed said envelope member in predetermined position on said turret;
  (f) means for inserting additional lamp members into the vitreous receiving members provided in said positioned envelope member;
  (g) sealing fire means to heat the vitreous receiving members provided in said envelope member to fuse said additional lamp members therein;
  (h) cooling means for directing a cooling medium at the envelope surface opposite to the receiving members during heating to prevent envelope member overheating; and
  (i) timing means for controlling the operation of said turret, said positioning means, said holding means, said additional lamp member inserting means, said sealing fire means, and said cooling means in the foregoing work sequence.

7. Fabricating apparatus for a vitreous lamp envelope member, said envelope member having vitreous lamp part receiving members provided in a surface thereof, said apparatus comprising:
  (a) a turret adapted to be indexed through a plurality of work stations;
  (b) a plurality of spaced frictionless-type supporting members carried on said turret for supporting the envelope member during processing, said supporting members permitting the supported envelope member to be rotatably moved with respect to said turret;
  (c) envelope member positioning means movable into registry with the lamp part receiving members provided in a surface of said envelope member to rotate said envelope member with respect to said turret through an amount as required to place said envelope member in predetermined position with respect to said turret;
  (d) envelope member holding means operable to restrain said envelope member from any further rotation with respect to said turret after said positioning means has placed said envelope member in predetermined position on said turret;
  (e) means for inserting additional lamp members into the vitreous receiving members provided in said positioned envelope member;
  (f) sealing fire means to heat the vitreous receiving members provided in said envelope member to fuse said additional lamp members therein; and
  (g) timing means for controlling the operation of said turret, said positioning means, said holding means, said additional lamp member inserting means, and said sealing fire means in the foregoing work sequence.

References Cited by the Examiner

UNITED STATES PATENTS

| | | | |
|---|---|---|---|
| 1,594,557 | 8/26 | Proeger | 65—348 X |
| 2,254,227 | 9/41 | Lewis | 65—348 X |
| 2,288,537 | 6/42 | Malloy | 65—208 X |
| 2,483,932 | 10/49 | Powell. | |
| 2,691,850 | 10/54 | Eber et al. | 65—348 |
| 2,837,870 | 6/58 | Hartley et al. | 65—280 |
| 2,917,869 | 12/59 | Schoenoff et al. | 65—280 |
| 2,918,962 | 12/59 | Jones | 269—289.1 X |

DONALL H. SYLVESTER, *Primary Examiner.*